Patented May 17, 1949

2,470,349

UNITED STATES PATENT OFFICE 2,470,349

CYCLOPROPYL FURYL PROPENONE

James W. Hansen and Carroll C. Cassil, Berkeley, Calif., assignors to California Spray-Chemical Corporation, Richmond, Calif., a corporation of Delaware No Drawing. Application May 29, 1945, Serial No. 596,600

2 Claims. (Cl. 260—345)

This invention relates to a new organic compound which is useful as a toxic ingredient in insecticidal compositions. More particularly, it relates to the compound cyclopropyl furyl propenone.

The compound of this invention may be described as a ketone which is the product of a condensation reaction between an aldehyde and a ketone. Specifically, it is a condensation product of furfuraldehyde and cyclopropyl methyl ketone. The structural form of the compound of this invention is as follows:

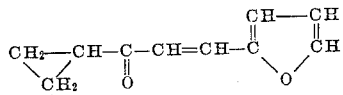

The precise name of this compound, according to Geneva nomenclature is: 1-cyclopropyl, 3-(2-furyl), 2-propen 1 one. The pure substance is, at normal atmospheric temperature, a colorless crystalline solid. The crystals are regular, rhombic, tabular in form, and exhibit parallel extinction. Crystallization does not take place readily except in the presence of at least a minute seed crystal of the substance, and, therefore, if reasonable precautions are taken, it may be preserved as a liquid even at temperatures many degrees below its melting point. In liquid form, cyclopropyl furyl propenone is a light straw color and has a distinctive, agreeable odor. This substance has the following properties:

| | |
|---|---|
| Boiling point (plus or minus 0.5 °C.): | |
| At 6 mm. Hg | 123.5° |
| At 12 mm. Hg | 137.0° |
| At 30 mm. Hg | 162.0° |
| Melting point | 38–38½°C. |
| Index of refraction of liquid | 1.6076 $\frac{20°}{20°}$ |
| Density of liquid at 25° C | 1.102 |
| Solubility in water | less than 0.01% |
| Molecular weight | 162 |

This substance is soluble in such organic solvents as acetone, ether, petroleum ether and furfural. It is sufficiently soluble in petroleum oil fractions such as kerosene and spray oils to permit its effective use as an insecticide in such carriers.

Cyclopropyl furyl propenone is somewhat unstable in the pure state even when kept in the dark and gradually changes from colorless to slightly yellow. The technical material as obtained without recrystallization will, on standing, change in color from light amber to dark yellow or dark red. This change reaches equilibrium after a short time, and affects only one to five percent of the material. When dissolved in petroleum oil, the stability of cyclopropyl furyl propenone is improved even in the presence of strong sunlight.

A preferred example of a method of preparing the compound of our invention is as follows: Mix together 1 mole of cyclopropyl methyl ketone, 1 mole of furfural and 750 ml. of aqueous sodium hydroxide solution (2.5% NaOH). These ingredients are stirred together until the reaction is approximately complete, which may require two to three hours at a temperature of 15°–20° C. The stirring is stopped and the reaction mix is allowed to settle. The cyclopropyl furyl propenone settles readily to the bottom of the vessel in the form of yellow crystals. In some cases, due possibly to the presence of impurities or the absence of seed crystals, the product appears in the form of an oily liquid. The top layer is decanted. The product is washed either with water or with a dilute mineral acid. The product so obtained will generally contain some impurities, particularly furfuraldehyde. Most of such impurities can be removed by simple steam distillation. The product purified in this manner is a satisfactory technical grade for use in making insecticidal compositions. Greater purification may be effected if desired by vacuum distillation or by recrystallization from a suitable solvent such as petroleum ether. The above described method of preparation results in a yield of approximately 95% based on the weight of cyclopropyl methyl ketone and furfural.

Certain variations in this synthesis are permissible. Other soluble alkalies may be substituted for NaOH if desired. The function of the alkali is apparently catalytic, and other sources of hydroxyl ion may be chosen. The concentration of hydroxyl ion is apparently not narrowly critical. Solutions of NaOH ranging from 0.5 to 6.0% concentration have been found to give satisfactory results. For practical purposes, good results may be obtained by carrying out the reaction within a temperature range of from 15 to 45° C. The volumetric ratio of aqueous alkaline solution to reactants may likewise be varied over a considerable range without serious loss of efficiency. For example, when aqueous sodium hydroxide solution is used, it may be varied in volume from about 400 to about 1000 ml. per mole of product.

We have observed that better results are obtained when an excessive proportion of furfural is avoided. The use of furfural in a ratio greater than 1 mole per mole of cyclopropyl methyl ketone leads to undesired tar formation and a less pure product.

We find that it is preferable to avoid acidification of the reaction mixture following the reaction, since acidification tends to precipitate tarry material which contaminates the product. We prefer to effect such purification as may be needed in the manner described, namely by subsequent distillation or by recrystallization.

The compound of our invention, cyclopropyl furyl propenone, has insecticidal properties to a high degree. When dissolved in kerosene, for example, to the extent of 3 to 5% by weight, and used as a space spray, it has been found to be a highly efficient insecticide against houseflies, producing not only complete and rapid "knock-down" but also complete 24-hour kill. This compound may also be embodied in other insecticidal compositions such as dust mixtures or water-emulsifying agents. It is chemically stable in the presence of dilute mineral acids and moderate concentration of alkali. It tends to polymerize when boiled with strong alkali. Furthermore, it is chemically compatible with other active insecticidal materials such as sulfur, arsenates, pyrethrins, rotenone, dichloro diphenyl tricholoroethane, and others, and therefore lends itself to use in multi-purpose insecticidal compositions containing such materials.

We claim:

1. As a new composition of matter, the compound

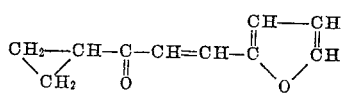

having a molecular weight of 162 and a regular rhombic crystalline form melting at 38–38½° C.

2. The method of preparing cyclopropyl furyl propenone which comprises mixing furfural with cyclopropyl methyl ketone in approximately equimolar proportions, agitating the mixture with aqueous alkaline solution, separating the cyclopropyl furyl propenone so formed, and subjecting it to distillation.

JAMES W. HANSEN.
CARROLL C. CASSIL.

REFERENCES CITED

The following references are of record in the file of this patent:

UNITED STATES PATENTS

| Number | Name | Date |
|---|---|---|
| 2,058,771 | Clifford | Oct. 27, 1936 |
| 2,212,529 | Swaine | Aug. 27, 1940 |
| 2,224,243 | Bowen | Dec. 10, 1940 |
| 2,385,314 | Thurston | Sept. 18, 1945 |

OTHER REFERENCES

Chem. Ab., vol. 32, page 9061 (1938); ibid., vol. 30, page 1053 (1936); ibid., vol. 22, page 582.

Certificate of Correction

Patent No. 2,470,349.　　　　　　　　　　　　　　　　May 17, 1949.

JAMES W. HANSEN ET AL.

It is hereby certified that error appears in the printed specification of the above numbered patent requiring correction as follows:

Column 2, line 2, after the word and period "sunlight." insert the following paragraph:

*Generally speaking, the method used in the manufacture of cyclopropyl furyl propenone is that used in condensing ketones having a free methyl group in the alpha position with aldehydes, that is, in the presence of dilute aqueous alkali.* and that the said Letters Patent should be read with this correction therein that the same may conform to the record of the case in the Patent Office.

Signed and sealed this 11th day of October, A. D. 1949.

[SEAL]

THOMAS F. MURPHY,
*Assistant Commissioner of Patents.*